May 1, 1934.  B. E. LENEHAN  1,957,275
SELF STARTING SUBSYNCHRONOUS CLOCK MOTOR
Filed Oct. 20, 1930
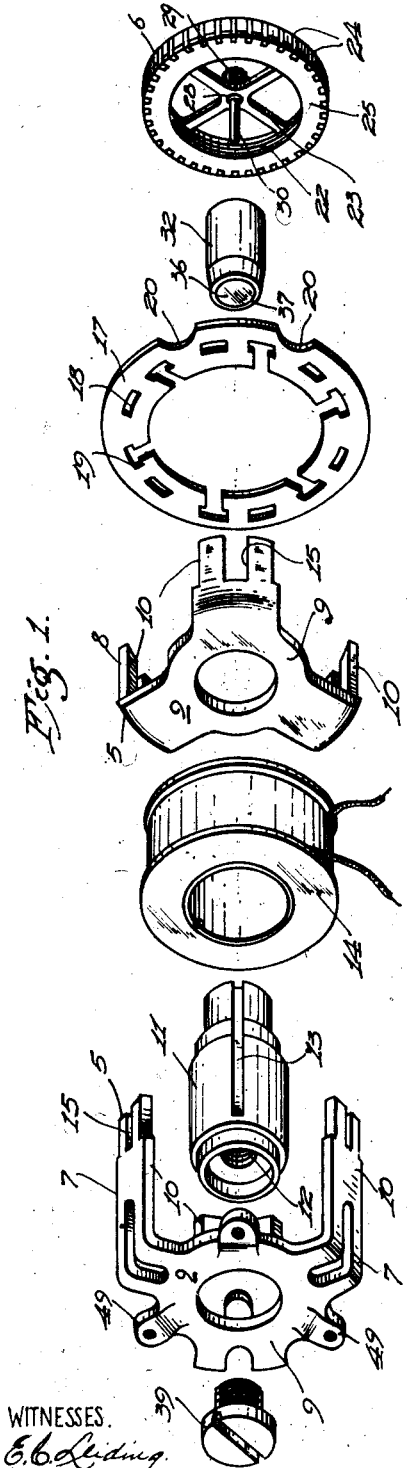
INVENTOR,
Bernard E. Lenehan.
BY
Wesley G. Carr
ATTORNEY
WITNESSES.

Patented May 1, 1934

1,957,275

UNITED STATES PATENT OFFICE 1,957,275

SELF-STARTING SUBSYNCHRONOUS CLOCK MOTOR

Bernard E. Lenehan, Bloomfield, N. J., assignor to Westinghouse Electric & Manufacturing Company, a corporation of Pennsylvania Application October 20, 1930, Serial No. 489,778

25 Claims. (Cl. 172—278)

My invention relates to small alternating-current electric clock motors which are designed to run synchronously at a sub-synchronous speed which is an aliquot fraction of the full synchronous speed, and it has particular relation to means for effectually eliminating the locking tendency at starting, while causing it to have a strong locking effect at the sub-synchronous running speed.

The objects of my invention are to provide such a self-starting, sub-synchronous clock motor, which is certain to start, which is positive in its sub-synchronizing action, which is substantially free of all vibration which would cause humming, which is simple, economical, rugged and effective in the construction of its stator-field member, its armature-rotor member and its bearing and lubricating device.

With the foregoing and other objects in view, my invention consists in the combinations and structures hereinafter described and claimed, and illustrated in the accompanying drawing, wherein Figure 1 is an enlarged, exploded perspective view of a motor embodying my invention;

Fig. 2 is an enlarged longitudinal sectional view of the motor;

Fig. 3 is an enlarged transverse cross-sectional view thereof on a broken plane indicated by the line III—III in Fig. 2, and Fig. 4 is a still further enlarged cross-sectional view of the bearing, as seen from the plane indicated by the line IV—IV in Fig. 2.

My invention is preferably applied to the design of very small clock motors having a capacity of not exceeding a few watts power. By way of illustration, I have shown a motor having a 6-pole stator 5 and a 36-tooth rotor 6, but it will be obvious that my invention is not limited to this particular combination of numbers of poles and teeth.

The stator member is composed of two heavy iron laminations 7 and 8 each having a disc portion 9 and three, laterally bent, initially-radial projections 10 constituting a plurality of split poles of one polarity, the bent projections of the stator lamination 7 being much longer than those of the stator lamination 8 and passing therebetween in spaced relation thereto, to complete the polar structure. The two stator disc portions 9 are spaced from each other and joined by a central steel hub 11 having a central bore 12 and preferably also having a longitudinally extending kerf 13 extending nearly into the central bore, for the purpose of materially reducing the eddy-current heating resulting from the fact that the motor is to be energized by alternating current. The stator hub 11 is surrounded by the alternating-current primary coil 14, which thus causes alternate poles 10 to be north poles at the same instant that the remaining poles are made south poles, this being accomplished by a single, centrally disposed coil. The two stator laminations 7 and 8, which constitute the magnetic flux-paths of opposite polarity, are cut and bent from relatively heavy or thick laminations which provide a solid iron construction which will not vibrate and produce a humming noise.

As before stated, each of the stator poles 10 is of a split-pole construction, this being effected by means of a slot 15 in each of the poles, thereby providing a total of twelve pole-halves or salient polar projections of the stator member. Alternate pole-halves are shaded, in order to produce a time-lag in the magnetic fluxes therein. Instead of utilizing separate rings of copper placed upon the several individual shaded poles, as has been customary heretofore, I very much prefer to utilize a single lag ring 17 which I have designed, said ring being provided with perforations 18 for fitting over the shaded pole-halves and thus causing said shaded pole-halves to be surrounded by the material of the lag ring, which is preferably copper, said ring being further provided, on its inner periphery, with intermediate open slots 19 for fitting over the unshaded pole-halves and bracing the same, without materially shading the same. I thus strengthen my polar construction, thereby tending to reduce noises, securing accurate positioning of the poles, the exact angular spacing of which will be hereinafter described, and at the same time simplifying the assembling operation. The two external notches 20, which are shown in the lag ring 17 in the drawing, have nothing to do with the electrical performance, being provided for the purpose of clearing parts of the clock mechanism (not shown) for which this motor was particularly designed.

The rotor member 6 of my motor is designed to rotate within the poles 10, as will be readily understood. This rotor member is also of a special construction which I believe to be a considerable improvement from a design standpoint. In the particular form shown in Figs. 1 and 2, it consists of four, toothed, soft-iron discs 22, against one side of which there is a combined spider and end-ring 23 of copper with initially-radial prongs 24 bent over so as to fit between the iron teeth of the four discs 22 and held thereto by friction, which is of considerable convenlence in handling the parts during the assembly operation. The rotor member is also provided, on the other side of the iron discs or laminations 22, with a plane copper end-ring 25 having teeth coincident with the iron teeth and soldered in place. The rotor member is also provided with a hub 28, a pinion 29, which is preferably integral with the hub, and a pin-shaft 30 with rounded ends.

The rotor shaft 30 is journaled in a bronze bearing-sleeve 32 which is press fitted into the adjacent end of the bore 12 of the stator hub 11, that is, the end adjacent to the stator polar structure 10. The bearing-sleeve 32 has a bore 33 adapted to journal said pin-shaft, and the inner end of this bore is marred by three star-punch grooves 34, as shown in Fig. 4, which provide oil passages around a steel ball thrust bearing 35 which fits tightly in said inner end of the journal bore 33. This notched end of the journal bore, which carries the ball 35, is countersunk, and a washer 36 is lodged in the countersink 37 for preventing the leakage of oil, except at a slow rate necessary to oil the journal and thrust bearing, through the notches or grooves 34 around the ball thrust bearing. The space back of the washer 36, and constituting perhaps half of the volume of the central bore 12 of the stator hub, constitutes an oil space or reservoir 38, which is closed by a plug 39 screwed into the back end of the bore 12 and made tight by a copper washer 40 or other oil packing.

For my washer 36, which prevents leakage of the oil only fast enough to lubricate the bearing, I have found it desirable to utilize a composite washer comprising a cork portion 44 in contact with the ball 35, backed up by a wood washer 45, between it and the oil space, having the grain running in the direction in which the oil flows, both washers, particularly the wooden one, fitting snugly within the countersink 37. I have also successfully used a bronze graphite compressed "alloy" for my washer 36.

The rotor is thus supported on a single bearing, with one end of its pin-shaft in engagement with the ball thrust bearing 35. The other end of the pin-shaft is prevented from displacement by a suitable abutment, such as a light leaf spring 47, which is supported by the clock mechanism or other support with which the motor is associated. It will be noted that the described rotor construction, overhanging from a single end spider, allows the center of gravity of the rotor to fall inside the bearing, thus permitting the use of only one bearing.

The motor is, or may be, mounted on the clock structure by means of a plurality of mounting feet or lugs 49 on the disc portion of the larger stator lamination 7, which thus constitutes a base for the motor.

Thus far, the novel structural features of my motor have been principally described. There are also important electrical design-features which must be observed in order to secure satisfactory self-starting operation and a positive and dependable sub-synchronizing action. These improvements were made possible through an analytic study which I have made of the conditions necessary to be met in a structure of this kind. I believe that these elementary theoretical conditions have never previously been known or taught, and that, while motors of this general type (self-starting and sub-synchronous) have been made previously, it was a matter of accident or experimental trial that workable designs or motors have been obtained. For example, my analysis has shown me that there is a material second harmonic in the square-topped, 36-tooth rotor reluctance wave, which has never been considered before, so far as I am aware of the prior art. In fact, the text books tell us that a symmetrical square-topped wave cannot have even harmonics, so that one would ordinarily have no reason for looking for the same. However, the rotor reluctance wave is not quite a square-topped wave, being rounded at the edges, and the rotor reluctance never drops altogether to zero, so that the rounding of the half waves corresponding to the rotor slots is very pronounced indeed, and the wave is not symmetrical.

According to my invention, I have devised novel means for practically eliminating all synchronizing or locking torques, at starting, corresponding to the fundamental and second harmonic of the rotor reluctance-curve. The higher harmonics, at least in the design which I have shown in my drawing, are so small that their locking effects at starting need not be considered.

In order that the motor may lock into a sub-synchronous speed, it is necessary that the number of rotor teeth, which constitute rotor poles, shall be larger than, and an exact multiple of, the number of stator teeth. In this case, the multiple is six, and the motor runs at $\frac{1}{6}$ of its full synchronous speed, or 200 R. P. M. on a 60-cycle circuit.

The shaded and unshaded pole-halves of my stator poles are so spaced that their centers are approximately an odd multiple of one-half of the rotor tooth-pitch apart, by rotor tooth-pitch meaning the angle subtended between the centers of two adjacent rotor teeth. Thus, the center of one unshaded half pole is over a rotor tooth at the same instant when the center of the corresponding shaded half pole is over a rotor slot, so that the locking effects of the two half poles, with respect to the fundamental rotor reactance-wave component, are 180 electrical degrees apart, in terms of the pole pitch of the said fundamental-wave component (and thus neutralize each other, provided that the pole strengths of the shaded and unshaded poles are the same). By "centers" of the pole halves, I mean the magnetic centers, making allowance for the greater fringing effect on the obtuse-angled side 40, (Fig. 3) than on the acute-angled side 41, these angles being the result of the way the poles are punched and bent.

The strength of the shaded pole is equal to the strength of the unshaded pole multiplied by the cosine of the angle of time lag which is produced by the shading or damping means. According to my design, this angle is preferably about 7°, or say between 5° and 10°, although the limits may possibly be even wider, according to the rotor secondary resistance, as will be hereinafter explained. The cosine of 7° is substantially unity, so that the two half poles are of substantially equal strengths, and this constitutes, therefore, one of the important points of my electrical design.

The locking effects of the second rotor reluctance-wave harmonic are eliminated by displacing the poles which are north at any instant from the poles that are south at the same instant, by approximately one-quarter of the rotor tooth-pitch from the normal position which would normally be some exact multiple of the rotor tooth-pitch. Thus, the stator poles of opposite polarity are displaced 90° out of phase, with respect to the pole pitch of the 36-pole rotor fundamental, or 180° out of phase with respect to the 72-pole rotor second harmonic, so that the locking effects of the second harmonic are thus eliminated.

At starting, therefore, the induction-motor starting torque of the squirrel-cage rotor (the squirrel cage being provided by the squirrel-cage conductors 24 joined by the end rings 23 and 25) easily starts the motor, under the influence of the rotating component of the pulsating stator torque, which is produced by the shading coils, without having to overcome any sensible reaction-motor locking effect, or magnetic locking, at starting.

The stator flux distribution contains a complete series of harmonics, although the even harmonics are quite small. On the other hand, the rotor reluctance distribution contains mainly a sinusoidal wave corresponding to a number of poles equal to twice the number of rotor teeth. It is this rotor reluctance wave which produces the sub-synchronizing action, which I refer to as the rotor reluctance or permeance fundamental.

Mathematically, any forward rotating stator-magnetomotive-force harmonic component of the order $N$ may be written $$B_N = A \cos(N\theta - \omega t),$$

where $A$ = a constant,
$\theta$ = an angle in space,
$\omega$ = the angular velocity of the fundamental = $2\pi f$,
where $f$ = frequency, and
$t$ = time.

The variable permeance of the rotor may be written $$P = B + C \cos(M\theta - vt),$$

where $B$ = a constant representing the unidirectional component of the permeance,
$C$ = a constant defining the strength of the sinusoidal wave,
$M$ = number of rotor teeth per pair of stator poles,
and $v$ = angular velocity of the rotor, in radians, considering one rotor tooth-pitch = $2\pi$ radians, or
$$v = M\omega(1-s),$$
where $s$ = slip.

The resulting fluxes are the product of the two, or $$H = AB \cos(N\theta - \omega t) + AC \cos(N\theta - \omega t) \cos(M\theta - vt)$$
$$= AB \cos(N\theta - \omega t) + \tfrac{1}{2} AC \cos[(M+N)\theta - (v+\omega)t] + \tfrac{1}{2} AC \cos[(M-N)\theta - (v-\omega)t].$$

If $v = 2\omega$, corresponding to a rotor speed equal to $$\frac{2}{M}$$

of full synchronous speed, the last term of the flux reduces to $\tfrac{1}{2} AC \cos[(M-N)\theta - \omega t]$, which obviously locks synchronously with the stator harmonic of the order $N_1 = M - N$, or $N + N_1 = M$.

This solution is perfectly general, so that any two stator harmonics having orders $N$ and $N_1$ the sum of which is $M$ will produce synchronous torque on a rotor of $M$ teeth per pair of stator poles. In the illustrated case, where $M = 12$, the pairs of harmonics are the 1st and 11th, the 3d and 9th, and the 5th and 7th, and also the even pairs, 2 and 10, 4 and 8, 6 and 6, but the even harmonics are rather small. The motor readily synchronizes at a running speed of $$\frac{2}{M} = \tfrac{1}{6}$$

of the full synchronous speed, with a strong reaction-motor effect.

The lag of the shading coils, with respect to this $\tfrac{1}{6}$ speed, is six times as great as at starting, or $6 \times 7 = 42$ electrical degrees, and it is essential that the cosine of this angle shall not be even approximately equal to $+1$, so that the reaction-motor effect will not cancel itself at the sub-synchronous operating speed.

My motor is also designed with a fairly high rotor resistance, so that the maximum torque, on the speed-torque curve, occurs at a negative, or backward, speed. It is known that an alternating or pulsating field flux may be resolved into two equal and opposite rotating fluxes of one-half the field strength of the pulsating field. The effect of the shading coils is to strengthen the forwardly rotating component flux and weaken the backwardly rotating component flux. Both of the rotational component fluxes produce torque, but as the forward flux is the larger, the motor starts in the forward direction. As the motor-speed increases, say to $\tfrac{1}{6}$ of the full synchronous speed, the slip with respect to the forwardly rotating field decreases from 100% to $\tfrac{5}{6}$, whereas the slip with respect to the backwardly rotating flux increases from 100% to 7/6. Since the rotor resistance is such that the maximum torque is developed at a negative speed, or at a slip of more than 100%, the torque developed by the backwardly rotating field increases, whereas the torque developed by the forwardly rotating field decreases, as the motor speeds up from standstill to $\tfrac{1}{6}$ speed. I make my design such that, at this $\tfrac{1}{6}$ speed, the induction-motor torques resulting from the forwardly and backwardly rotating fields approximately neutralize each other, so that there is little of no tendency for the motor to speed ahead beyond its $\tfrac{1}{6}$ speed, and the reaction-motor effect, or magnetic locking of poles, can thus have full control of the operation of the motor at this speed, to produce exact synchronization with the alternating-current supply. The relative strengths of the forwardly and backwardly rotating fields are controlled by the amount of lag produced by the shading coils.

While I have described my motor in one preferred form of construction, and while I have explained its construction and mode of operation as I now understand the same, it is desired that the appended claims shall not be strictly limited to any specific structural design or theory of operation, except as is expressly called for by the language of the claims, when construed in the light of the prior art.

I claim as my invention:

1. A self-starting single-phase subsynchronous induction-reaction motor characterized by an armature-rotor member capable of producing an induction-motor starting-torque and having a toothed magnetic polar construction, and a field-stator member comprising poles of opposite polarities, each split into halves, a single-phase coil for energizing said poles, and lag means on alternate pole-halves, the rotor having a number of teeth which is a multiple of the number of the stator poles, the shaded and unshaded pole-halves having their centers spaced by approximately an odd multiple of one-half of the rotor tooth-pitch, the north poles being spaced from the south poles by some multiple of the rotor tooth-pitch plus or minus approximately one-quarter of the rotor tooth-pitch.

2. A self-starting single-phase subsynchronous induction-reaction motor of not exceeding a few watts power consumption, characterized by an armature-rotor member capable of producing an induction-motor starting-torque and having a toothed magnetic polar construction, and a field-stator member comprising poles of opposite polarities, each split into halves, a single-phase coil for energizing said poles, and lag means on alternate pole-halves, the rotor having a number of teeth which is a multiple of the number of the stator poles, the shaded and unshaded pole-halves having their centers spaced by approximately an odd multiple of one-half of the rotor tooth-pitch, the poles which are north at a given instant being spaced from the poles which are south at the same instant by a distance which only approximates some multiple of the rotor tooth-pitch.

3. A self-starting single-phase subsynchronous induction-reaction motor characterized by an armature-rotor member capable of producing an induction-motor starting-torque and having a toothed magnetic polar construction, and a field-stator member comprising poles of opposite polarities, each split into halves, a single-phase coil for energizing said poles, and lag means on alternate pole-halves, the rotor having a number of teeth which is a multiple of the number of the stator poles, the shaded and unshaded pole-halves having their centers spaced by approximately an odd multiple of one-half of the rotor tooth-pitch.

4. A self-starting single-phase subsynchronous induction-reaction motor characterized by an armature-rotor member capable of producing an induction-motor starting-torque and having a toothed magnetic polar construction, and a field-stator member comprising poles of opposite polarity having a pole-pitch larger than the rotor tooth-pitch and equal approximately to a multiple of the rotor tooth-pitch plus or minus a displacement of the order of one-quarter of the rotor tooth-pitch, half of the stator poles of each polarity being dephased from the other half of the stator poles of the same polarity by a time-phase angle the cosine of which is not much below unity, the amount of dephasing and the effective induction-motor secondary resistance being such that the induction-motor torques produced by the forwardly and backwardly rotating fundamental component fluxes are approximately equal at the subsynchronous operating speed, the spatial displacement or pitch between the centers of any two dephased stator poles of the same polarity being approximately an odd multiple of one-half of the rotor tooth-pitch.

5. A self-starting single-phase subsynchronous induction-reaction motor of not exceeding a few watts power consumption, characterized by an open-slot squirrel-cage rotor having slots and teeth of approximately equal widths, a split-pole stator having a smaller number of poles than the rotor has teeth, shaded-flux means associated with one-half of each split pole, the center of a shaded pole-half being over approximately the center of a tooth when the center of an unshaded pole-half is over approximately the center of a slot, while at the same time the centers of the pole-halves of opposite polarity are approximately over the dividing-lines between other teeth and slots.

6. A self-starting single-phase subsynchronous induction-reaction motor of not exceeding a few watts power consumption characterized by a rotor member comprising a few toothed soft-iron disks, a combined spider and end-ring of a good-conductor metal with prongs bent over so as to fit between the iron teeth and held thereto by friction, a plane end-ring of a good-conductor metal having teeth coincident with the iron teeth and soldered in place in contact with the ends of said bent-over prongs, a hub, a pinion and a pin-shaft with rounded ends; a stator member comprising two heavy iron laminations each having a disk portion and laterally bent projections constituting a plurality of split poles of one polarity, the two stator disk portions being spaced from each other, a hub joining said two stator disk portions, said hub having a central bore and having a longitudinally extending kerf extending nearly into the central bore, a single-phase winding on said hub, the bent projections of one stator lamination being much longer than those of the other and passing therebetween in spaced relation thereto, to provide a polar structure spaced axially from said hub and winding, and a perforated and slotted metal lag ring fitting over all of the split-pole projections of the polar stator structure for bracing the same and for producing a time lag in the flux in one pole-half of each split pole, said lag ring having perforations completely surrounded by the material of the lag ring for surrounding the shaded pole-halves and having open slots for receiving the unshaded pole-halves; and a bearing and lubricating means disposed in the bore of said stator hub and comprising a bearing-sleeve having a bore adapted to journal said pin-shaft.

7. In an electric motor, a rotor member comprising a shaft, a few toothed soft-iron washer like disks, spaced from the shaft, a combined spider and end-ring of copper mounted on the shaft, said end-ring having prongs bent over so as to fit between the iron teeth and held thereto by friction, a plane copper washer-like end-ring spaced from the shaft and having teeth coincident with the iron teeth and soldered in place in contact with the ends of said bent-over prongs.

8. In an electric motor, a rotor member comprising a shaft, a toothed magnetizable washer-like core spaced from the shaft, and a combined spider and squirrel-cage member comprising a disk of a conducting metal mounted on the shaft and having integral, bent-over cage-bars lying in said toothed core.

9. In an electric motor, a stator member comprising two heavy iron laminations each having a disk portion and laterally bent projections constituting a plurality of split poles of one polarity, the two stator disk portions being spaced from each other, a hub joining said two stator disk portions, said hub having a central bore and having a longitudinally extending kerf extending nearly into the central bore, a single-phase winding on said hub, the bent projections of one stator lamination being much longer than those of the other and passing therebetween in spaced relation thereto, to provide a polar structure spaced axially from said hub and winding, and a perforated and slotted metal lag ring fitting over all of the split-pole projections of the polar stator structure for bracing the same and for producing a time lag in the flux in one pole-half of each split pole, said lag ring having perforations completely surrounded by the material of the lag ring for surrounding the shaded pole-halves and having open slots for receiving the unshaded pole-halves; and a bearing and lubricating means disposed in the bore of said stator hub.

10. In an electric motor, a stator member comprising two heavy iron laminations each having a disk portion and laterally bent projections constituting a plurality of poles of one polarity, the two stator disk portions being spaced from each other, a hub joining said two stator disk portions, said hub having a central bore and having a longitudinally extending kerf extending nearly into the central bore, a single-phase winding on said hub, the bent projections of one stator lamination being much longer than those of the other and passing therebetween in spaced relation thereto, to provide a polar structure comprising a plurality of poles of opposite polarities spaced axially from said hub and winding, lag means for producing a time-lag of the magnetic flux in alternate pole-halves of the split poles, a lubricated bearing means disposed in the bore of said stator hub, and a rotor member mounted on a shaft journaled solely in said bearing means and having a center of gravity falling within said bearing means.

11. A split-pole, subsynchronous-speed, self-starting, single-phase motor, with lag means on alternate pole-halves, characterized by a toothed magnetizable armature member having a number of teeth which is larger than the number of primary poles and which is an exact multiple of the number of primary poles, and further characterized by the two halves of each split pole being so displaced as to substantially neutralize the locking effect of the rotor fundamental reluctance-wave component at starting, the angle of shift of the flux in the shaded pole-halves being such that the cosine of said angle is sufficiently close to unity to prevent locking at starting, but the cosine of the product of this angle multiplied by the ratio of the full synchronous speed to the operating subsynchronous speed is not even approximately equal to +1.

12. A split-pole, subsynchronous-speed, self-starting, single-phase motor, the primary member having twice as many polar projections as there are poles, with lag means on alternate polar projections, characterized by a toothed magnetizable armature member having a number of teeth which is larger than the number of primary poles and which is an exact multiple of the number of primary poles, and further characterized by half of the primary polar projections being so displaced from the others as to substantially neutralize the locking effect of the rotor fundamental reluctance-wave component at starting.

13. A split-pole, subsynchronous-speed, self-starting, single-phase motor, the primary member having twice as many polar projections as there are poles, with lag means on alternate polar projections, characterized by a toothed magnetizable armature member having a number of teeth which is larger than the number of primary poles and which is an exact multiple of the number of primary poles, and further characterized by half of the primary polar projections being so displaced from the others as to substantially neutralize the locking effect of the second rotor harmonic reluctance-wave component at starting.

14. A split-pole, subsynchronous-speed, self-starting, single-phase motor, the primary member having twice as many polar projections as there are poles, with lag means on alternate polar projections, characterized by a toothed magnetizable armature member having a number of teeth which is larger than the number of primary poles and which is an exact multiple of the number of primary poles, and further characterized by half of the primary polar projections being so displaced from the others as to substantially neutralize the locking effect of the rotor fundamental reluctance-wave component at starting, another group of half of the primary polar projections being so displaced from the others as to substantially neutralize the locking effect of some rotor harmonic reluctance-wave compoent at starting.

15. The invention as defined in claim 14, characterized by the angle of shift of the flux in the shaded pole-halves being such that the cosine of said angle is sufficiently close to unity of prevent locking at starting, but the cosine of the product of this angle multiplied by the ratio of the full synchronous speed to the operating subsynchronous speed is not even approximately equal to +1.

16. A self-starting subsynchronous single-phase motor having a single-phase, salient-pole stator member and a squirrel-cage, salient-toothed rotor member, the salient pole members of the stator being so spaced as to produce the effect of an N-pole primary member with markedly non-sinusoidal flux distribution, the rotor having M.

$$\frac{N}{2}$$

teeth such that the ratio of the subsynchronous operating speed to the full synchronous speed is $$\frac{2}{M}$$

and is an aliquot fraction of unity, each stator pole member being split into two halves having their centers so spaced that one center is over substantially the center of a rotor tooth at the same instant that the other center is over substantially the center of a rotor slot, and lag-means associated with alternate stator-pole-halves, half of the salient pole members of the stator being displaced from their true N-pole positions by approximately one quarter of the angle between the centers of two adjacent rotor teeth.

17. A self-starting subsynchronous single-phase motor having a single-phase, salient-pole stator member and a squirrel-cage, salient-toothed rotor member, the salient pole members of the stator being so spaced as to produce the effect of an N-pole primary member with markedly non-sinusoidal flux distribution, the rotor having M.

$$\frac{N}{2}$$

teeth such that the ratio of the subsynchronous operating speed to the full synchronous speed is $$\frac{2}{M}$$

and is an aliquot fraction of unity, each stator pole member being split into two halves having their centers so spaced that one center is over substantially the center of a rotor tooth at the same instant that the other center is over substantially the center of a rotor slot, and lag-means encircling alternate stator-pole-halves, said lag-means producing an angle of lag having a cosine approximately equal to unity yet sufficient to produce an effective starting torque, the amount of lag and the effective induction-motor secondary resistance being such that the induction-motor torques produced by the forwardly and backwardly rotating fundamental component fluxes are approximately equal at the subsynchronous operating speed.

18. A self-starting subsynchronous single-phase motor having a single-phase, salient-pole stator member and a squirrel-cage, salient-toothed rotor member, the salient pole members of the stator being so spaced as to produce the effect of an N-pole primary member with markedly non-sinusoidal flux distribution, the rotor having M.

$$\frac{N}{2}$$

teeth such that the ratio of the subsynchronous operating speed to the full synchronous speed is $$\frac{2}{M}$$

and is an aliquot fraction of unity, each stator pole member being split into two halves having their centers so spaced that one center is over substantially the center of a rotor tooth at the same instant that the other center is over substantially the center of a rotor slot, and lag-means encircling alternate stator-pole-halves, said lag-means producing an angle of lag having a cosine approximately equal to unity yet sufficient to produce an effective starting torque, the effective squirrel-cage resistance being so high that the maximum induction-motor torque produced by a rotating stator field occurs at a slip higher than 100%.

19. A self-starting subsynchronous single-phase motor having a single-phase, salient-pole stator member and a squirrel-cage, salient-toothed rotor member, the salient pole members of the stator being so spaced as to produce the effect of an N-pole primary member with markedly non-sinusoidal flux distribution, the rotor having M.

$$\frac{N}{2}$$

teeth such that the ratio of the subsynchronous operating speed to the full synchronous speed is $$\frac{2}{M}$$

and is an aliquot fraction of unity, each stator pole member being split into two halves having their centers so spaced that one center is over substantially the center of a rotor tooth at the same instant that the other center is over substantially the center of a rotor slot, and lag-means encircling alternate stator-pole-halves, said lag-means producing an angle of lag having a cosine approximately equal to unity yet sufficient to produce an effective starting torque, the effective squirrel-cage resistance being so high that the maximum induction-motor torque produced by a rotating stator field occurs at a slip higher than 100%, half of the salient pole members of the stator being displaced from their true N-pole positions by approximately one quarter of the angle between the centers of two adjacent rotor teeth.

20. A self-starting single-phase motor of not exceeding a few watts power consumption characterized by a stator member comprising two magnetizable polar members having radially extending magnetizable portions, each having laterally projecting magnetizable portions constituting a plurality of split poles of one polarity, the two stator radially extending portions being spaced from each other, a hub joining said two stator radially extending portions, a single-phase winding on said hub, the projections of one stator pole member being much longer than those of the other and passing therebetween in spaced relation thereto, to provide a polar structure comprising a plurality of poles of opposite polarities spaced axially from said hub and winding, and a perforated and slotted annular metal lag ring fitting over all of the split-pole projections of the polar stator structure for bracing the same and for producing a time lag in the flux in one pole-half of each split pole, said annular lag ring having perforations completely surrounded by the material of the lag ring for surrounding the shaded pole-halves and having partly open slots on the inner periphery thereof for receiving and partly surrounding the unshaded pole-halves.

21. A self-starting single-phase motor of not exceeding a few watts power consumption characterized by a stator member comprising two magnetizable laminations having disk portions, each having integral, laterally bent magnetizable projections constituting a plurality of split poles of one polarity, flux-shifting means associated with some of said split poles, the two stator disk portions being spaced from each other, a hub joining said two stator disk portions, said hub having a central bore, a single-phase winding on said hub, the bent projections of one stator lamination being much longer than those of the other and passing therebetween in spaced relation thereto, to provide a polar structure comprising a plurality of poles of opposite polarities spaced axially from said hub and winding, a lubricated bearing means disposed in the bore of said stator hub, and a rotor member mounted on a shaft journaled solely in said bearing means and having a center of gravity falling within said bearing means.

22. A self-starting single-phase motor of not exceeding a few watts power consumption characterized by a stator member comprising two magnetizable laminations having disk portions, each having integral, laterally bent magnetizable projections constituting a plurality of split poles of one polarity, the two stator disk portions being spaced from each other, a hub joining said two stator disk portions, a single-phase winding on said hub, the projections of one stator lamination being much longer than those of the other and passing therebetween in spaced relation thereto, to provide a polar structure comprising a plurality of poles of opposite polarities spaced axially from said hub and winding, and a perforated and slotted annular metal lag ring fitting over all of the split-pole projections of the polar stator structure for bracing the same and for producing a time lag in the flux in one pole-half of each split pole, said annular lag ring having perforations completely surrounded by the material of the lag ring for surrounding the shaded pole-halves and having open slots on the inner periphery thereof for receiving the unshaded pole-halves.

23. A self-starting single-phase motor of not exceeding a few watts power consumption characterized by a stator member comprising two magnetizable laminations having disk portions, a separate set of magnetizable projections constituting a plurality of split poles of one polarity extending laterally from each of said stator disk portions, the two stator disk portions being spaced from each other, a hub joining said two stator disk portions, a single-phase winding on said hub, the projections of one stator lamination being much longer than those of the other and passing therebetween in spaced relation thereto, to provide a polar structure comprising a plurality of poles of opposite polarities spaced axially from said hub and winding, and a perforated and slotted annular metal lag ring fitting over all of the split-pole projections of the polar stator structure for bracing the same and for producing a time lag in the flux in one pole-half of each split pole, said annular lag ring having perforations completely surrounded by the material of the lag ring for surrounding the shaded pole-halves and having open slots on the inner periphery thereof for receiving the unshaded pole-halves.

24. A self-starting single-phase motor of not exceeding a few watts power consumption characterized by a stator member comprising two magnetizable laminations having disk portions, a separate set of magnetizable projections constituting a plurality of split poles of one polarity extending laterally from each of said stator disk portions, the two stator disk portions being spaced from each other, a hub joining said two stator disk portions, said hub having a central bore, a single-phase winding on said hub, the projections of one stator lamination being much longer than those of the other and passing therebetween in spaced relation thereto, to provide a polar structure comprising a plurality of poles of opposite polarities spaced axially from said hub and winding, flux-shifting means associated with some of said split poles, a lubricated bearing-means disposed in the bore of said stator hub, and a rotor member mounted on a shaft journaled solely in said bearing means.

25. A self-starting subsynchronous single-phase motor having a single-phase, salient-pole stator member and a squirrel-cage, salient-toothed rotor member, the salient pole members of the stator being so spaced as to produce the effect of an N-pole primary member with markedly non-sinusoidal flux distribution, the rotor having M.

$$\frac{N}{2}$$

teeth such that the ratio of the subsynchronous operating speed to the full synchronous speed is $$\frac{2}{M}$$

and is an aliquot fraction of unity, each stator pole member being split into two halves having their centers so spaced that one center is over substantially the center of a rotor tooth at the same instant that the other center is over substantially the center of a rotor slot, and lag-means associated with alternate stator-pole-halves.

BERNARD E. LENEHAN.